United States Patent
Komatsuka (10) Patent No.: US 8,690,496 B2
(45) Date of Patent: Apr. 8, 2014

(54) CUTTING INSERT AND CUTTING TOOL (75) Inventor: Tomomi Komatsuka, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 60 days.

(21) Appl. No.: 13/419,224

(22) Filed: Mar. 13, 2012

(65) Prior Publication Data

US 2012/0170987 A1 Jul. 5, 2012

Related U.S. Application Data

(63) Continuation of application No. PCT/JP2010/066552, filed on Sep. 24, 2010.

(30) Foreign Application Priority Data

Sep. 25, 2009 (JP) .................... 2009-220451

(51) Int. Cl.
*B23B 27/22* (2006.01)
*B23B 27/00* (2006.01)

(52) U.S. Cl.
USPC ............................... 407/114; 407/113

(58) Field of Classification Search
USPC .................. 407/113, 114, 115, 116
See application file for complete search history.

(56) References Cited

U.S. PATENT DOCUMENTS

| | | | |
|---|---|---|---|
| 3,381,349 A | | 5/1968 | Newcomer |
| 4,056,871 A | * | 11/1977 | Bator ............................ 407/114 |
| 4,087,193 A | * | 5/1978 | Mundy ........................... 407/114 |
| 4,116,576 A | * | 9/1978 | Gawryk, Sr. ................... 407/114 |
| 5,116,167 A | * | 5/1992 | Niebauer ....................... 407/114 |
| 5,123,788 A | * | 6/1992 | Friederichs et al. .......... 407/114 |
| 5,230,591 A | * | 7/1993 | Katbi et al. .................... 407/114 |
| 5,324,144 A | | 6/1994 | Katbi et al. |
| 5,460,464 A | * | 10/1995 | Arai et al. ...................... 407/114 |
| 5,897,272 A | * | 4/1999 | Wiman et al. ................. 407/114 |
| 6,234,726 B1 | * | 5/2001 | Okada et al. ................... 407/114 |
| 6,786,682 B1 | * | 9/2004 | Wiman .......................... 407/114 |

FOREIGN PATENT DOCUMENTS

| | | |
|---|---|---|
| JP | S61-20204 | 2/1986 |
| JP | H042504 U | 1/1992 |
| JP | 08-011007 | 1/1996 |
| JP | 2000-107911 | 4/2000 |
| JP | 2003-275907 | 9/2003 |
| JP | 2007-175788 | 7/2007 |

OTHER PUBLICATIONS

Official Action dated Sep. 11, 2012 issued in Japanese counterpart application (No. 2011-533045).
International Preliminary Report on Patentability (IPRP) dated Apr. 5, 2012 issued in PCT counterpart application (No. PCT/JP2010/066552).

(Continued)

*Primary Examiner* — Will Fridie, Jr.
(74) *Attorney, Agent, or Firm* — Womble Carlyle (57) ABSTRACT

A cutting insert includes a rake face extending along a cutting edge and a rising wall surface extending so as to form a recess along the cutting edge together with the rake face. The rake face is formed to have a positive rake angle, and includes a first rake face and a second rake face arranged in order in a direction in which a distance from the cutting edge increases. The second rake face is larger than the first rake face in rake angle.

15 Claims, 7 Drawing Sheets

(56) References Cited

OTHER PUBLICATIONS

International Search Report in PCT/JP2010/066552, dated Nov. 16, 2010.

Official Action dated May 30, 2013 (mailed on Jun. 4, 2013) in Russian counterpart application (No. 2012111269).

* cited by examiner

CUTTING INSERT AND CUTTING TOOL

CROSS-REFERENCE TO RELATED APPLICATIONS

This is a Continuation of International Application No. PCT/JP2010/066552, filed 24 Sep. 2010 and published as WO 2011/037186A1, which claims priority to Japanese Patent Application No. 2009-220451, filed Sep. 25, 2009. The contents of the aforementioned applications are incorporated by reference in their entirety.

BACKGROUND OF THE INVENTION

1. Field of the Invention

The present invention relates to a cutting insert for mounting on a cutting tool body and a cutting tool.

2. Description of the Related Art

An example of a cutting insert for installation on an edge replaceable cutting tool is disclosed in Japanese Patent Laid-Open No. 2000-107911. According to the description in Japanese Patent Laid-Open No. 2000-107911, the cutting insert (throwaway chip) in Japanese Patent Laid-Open No. 2000-107911 is devised to deal with cutting fields of cutting from finished cutting to light and medium cutting. The cutting insert is generally shaped like a rhombic plate, and includes a lower surface serving as a seating face to be seated on a cutting tool body and an upper surface lying opposite the lower surface.

A nose portion is formed at an acute corner of a rake face on the upper surface, and in this nose portion a nose portion cutting edge connected to two straight cutting edges is formed. The nose portion projects from the lower surface in a direction in which the distance from the lower surface increases. The nose portion cutting edge is shaped like a protruding circular arc. Thus, rake angle varies in an increasing manner from an end point toward a central point of the nose portion cutting edge, and is largest at the central point. Furthermore, a chip breaker is formed on the upper surface and is formed of a top surface that is a plane substantially parallel to the lower surface and a breaker wall surface raised from the rake face to the top surface in an inclined manner.

In the cutting insert described in Japanese Patent Laid-Open No. 2000-107911, the rake face along cutting edges located away from the opposite ends of the nose portion cutting edge have a small rake angle. Thus, in cutting using the cutting insert, chips generated at these cutting edges are generally thick. Therefore, the chips and the cutting edges become hot, and the cutting insert is increasingly worn away and may have a shortened life.

Moreover, according to the description in Japanese Patent Laid-Open No. 2000-107911, chips generated at the cutting edges such as the nose portion cutting edge travel over the surface of the cutting insert while slipping over the rake face and the nose portion rake face, and collide against the breaker wall surface of the chip breaker. Hence, particularly if the chips generated are thick, the rake face is more likely to be worn away. Therefore, such a cutting insert is problematic in terms of tool life.

SUMMARY OF THE INVENTION

The present invention provides a cutting insert with a cutting edge, the cutting insert including a rake face extending along the cutting edge and formed to have a positive rake angle, the rake face including a first area and a second area arranged in order in a direction in which a distance from the cutting edge increases, the rake face being formed such that a second rake angle in the second area is larger than a first rake angle in the first area, and a rising wall surface extending so as to form a recess along the cutting edge together with rake face, the rising wall surface being formed so as to be divided into two areas by an extension surface defined to extend the first area on a plane defined to be orthogonal to the cutting edge.

Furthermore, the present invention provides a cutting tool with a cutting edge, the cutting tool including a rake face extending along the cutting edge and formed to have a positive rake angle, the rake face including a first area and a second area arranged in order in a direction in which a distance from the cutting edge increases, the rake face being formed such that a second rake angle in the second area is larger than a first rake angle in the first area, and a rising wall surface extending so as to form a recess along the cutting edge together with rake face, the rising wall surface being formed so as to be divided into two areas by an extension surface defined to extend the first area on a plane defined to be orthogonal to the cutting edge.

Further features of the present invention will become apparent from the following description of exemplary embodiments (with reference to the attached drawings).

DESCRIPTION OF THE EMBODIMENTS

The present invention will be described below based on embodiments, with reference to the drawings.

Figure 1:
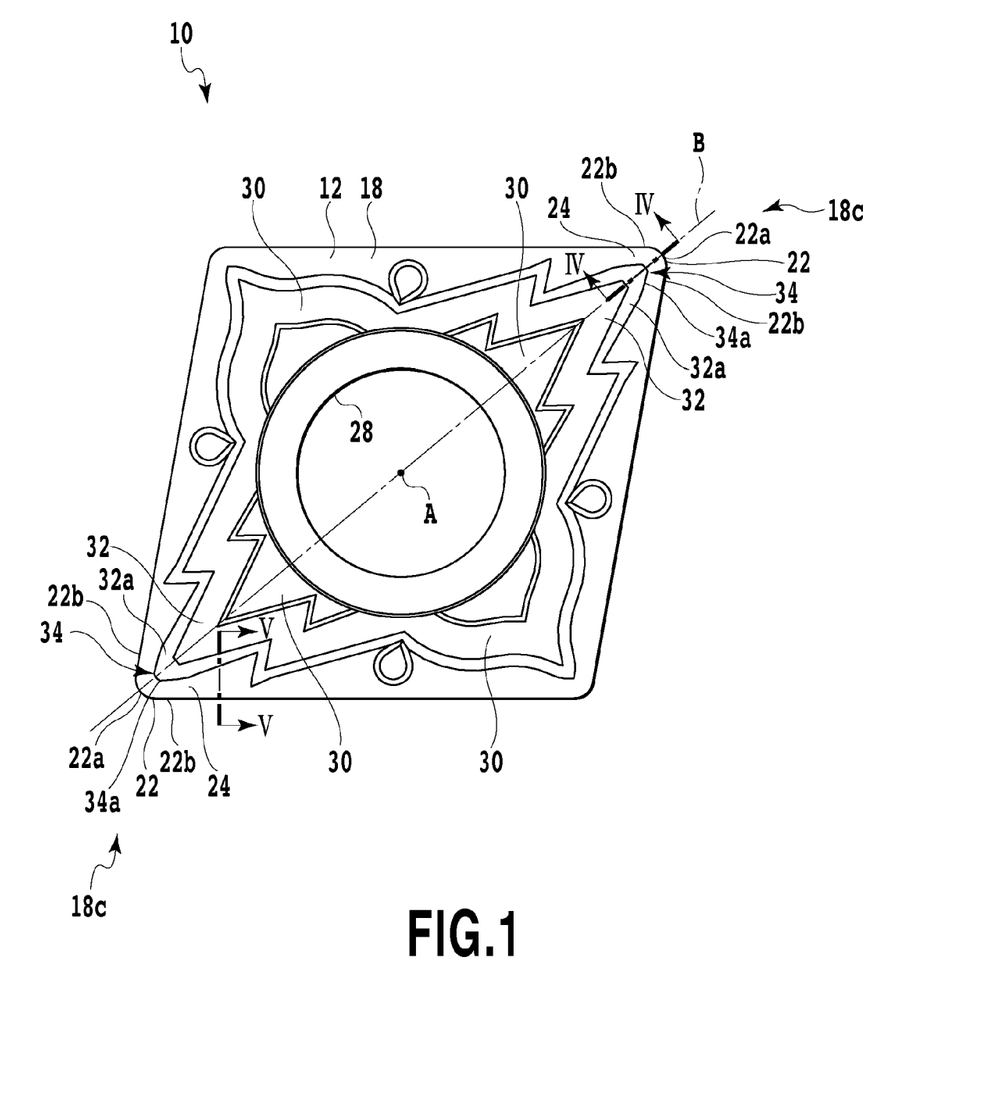
FIG. 1 is a plan view of a cutting insert according to a first embodiment of the present invention.
Figure 2:
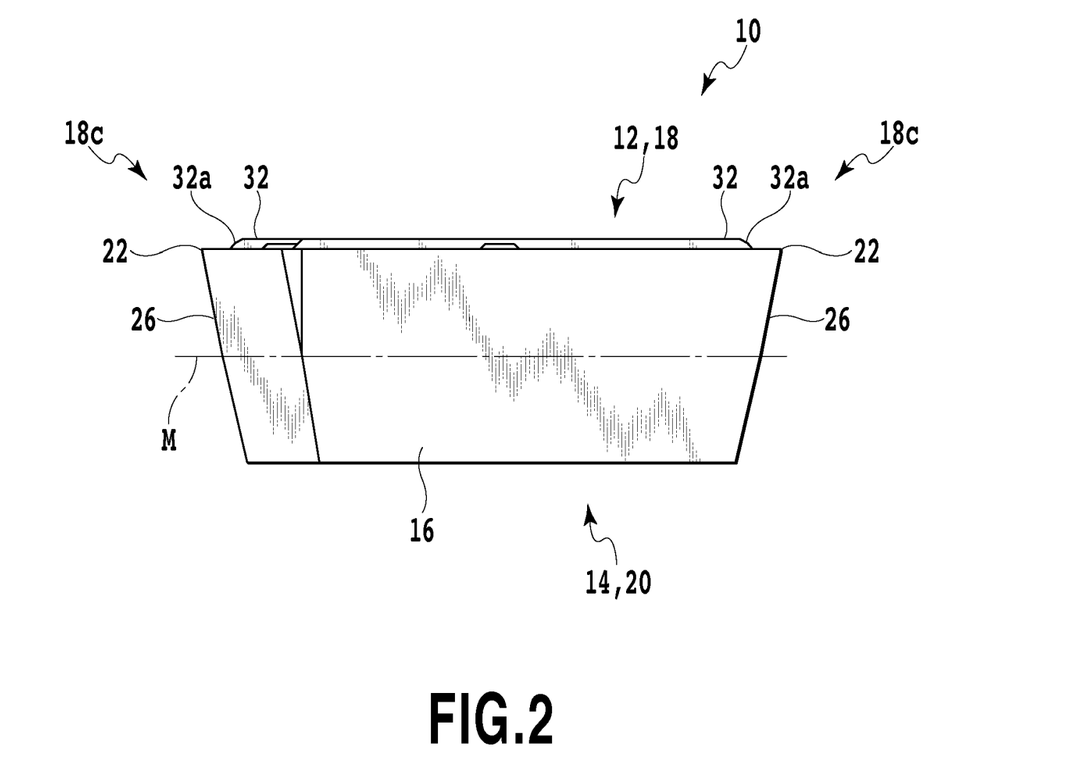
FIG. 2 is a side view of the cutting insert in FIG. 1.
Figure 3:
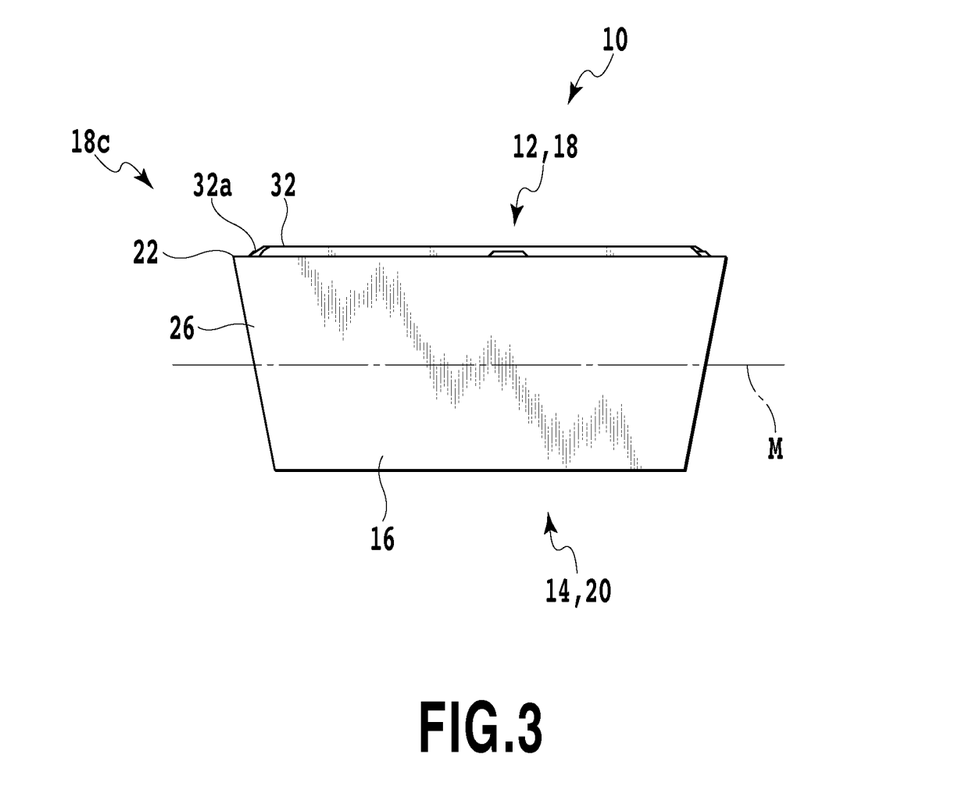
FIG. 3 is a side view of the cutting insert in FIG. 1.

As shown in FIG. 1 to FIG. 3, a cutting insert 10 according to a first embodiment of the present invention is shaped substantially like a rhombic plate. The cutting insert 10 includes two opposite end surfaces 12 and 14 and a peripheral side surface 16 extending between the two end surfaces 12 and 14. In the cutting insert 10, an axis A is defined which extends through the two end surfaces 12 and 14. Of the two end surfaces 12 and 14, the end surface 12 is an upper surface 18, and the other end surface 14 is a lower surface 20 and is configured to function as a seating face that comes into abutting contact with a bottom surface of an insert mounting seat provided on a tool body (not shown in the drawings) of a cutting tool. Each of the two end surfaces 12 and 14, particularly the upper surface 18 corresponding to the end surface 12, is rotationally symmetric with respect to the axis A.

A cutting edge 22 is formed in association with a ridge portion of an acute corner portion 18c of the upper surface 18. The cutting insert 10 includes two acute corner portions 18c on the upper surface 18 and thus has two cutting edges 22. The two cutting edges 22 have substantially the same configuration and are formed to be rotationally symmetric with respect to the axis A as is apparent from the above description. That is, the two cutting edges 22 are indexable, and the cutting insert 10 is an indexable cutting insert. The cutting insert 10 will be described below in conjunction with any one of the two cutting edges 22. The present invention does not limit the number of cutting edges formed in connection with one end surface. One or more cutting edges may be formed in connection with one end surface.

The cutting edge 22 is formed at an intersection between the upper surface 18 and the peripheral side surface 16. The cutting edge 22 extends between a rake face 24 on the upper surface 18 and a relief face 26 on the peripheral side surface 16. In this regard, as is apparent from FIG. 2 and FIG. 3, the relief face 26 forms substantially an acute angle to the end surface 12, that is, the upper surface 18, and thus has a positive relief angle. The relief angle may be set to 20° or less. In the cutting insert 10 according to the present embodiment, the relief angle is set to 7°.

In this regard, however, the relief angle of the relief face 26 may be 0°. In this case, each of the opposite end surfaces 12 and 14 crosses the peripheral side surface 16 at right angles. Thus, in this case, both end surfaces 12 and 14 may be configured in the same manner so as to be selectively used as the upper surface 18. Each of the end surfaces of the cutting insert both of which are usable is rotationally symmetric with respect to the axis A and both end surfaces of the cutting insert can be rotationally symmetric with respect to an axis orthogonal to the axis A. In such case, the insert can be considered to be a double-faced cutting insert.

The cutting edge 22 is formed to substantially extend on one plane orthogonal to the axis A. The cutting edge 22 includes a circular-arc cutting edge 22a and linear cutting edges 22b. The circular-arc cutting edge 22a is formed on the ridge portion of the acute corner portion 18c of the upper surface 18. The circular-arc cutting edge 22a forms a circular arc. In the present embodiment, the circular arc forming the circular-arc cutting edge 22a has a radius of curvature of 0.8 mm. The linear cutting edges 22b extend so as to be continuous with the circular-arc cutting edge 22a. The linear cutting edges 22b extend from the opposite ends of the circular-arc cutting edge 22a. That is, each cutting edge 22 includes two linear cutting edges 22b. The circular-arc cutting edge 22a and the linear cutting edges 22b form the cutting edge 22 that comes into contact with a workpiece.

The cutting insert 10 includes a mounting hole 28 formed therein to penetrate both end surfaces 12 and 14 in a thickness direction thereof. The center axis of the mounting hole 28 coincides with the axis A of the cutting insert 10. On the upper surface 18, boss faces 30 are scattered around the opening of the mounting hole 28. The boss faces 30 are located higher than the circular-arc cutting edge 22a and the linear cutting edges 22b and on the same plane. That is, when a plane (hereinafter referred to as a intermediate plane) M is defined which passes through the peripheral side surface 16 so as to cross the axis A at right angles and divide the cutting insert 10 into two equal parts in the vertical direction (see FIG. 2 and FIG. 3), the distance between each of the boss faces 30 and the intermediate plane M is longer than the distance between the intermediate plane M and the cutting edge 22 including the circular-arc cutting edge 22a and the linear cutting edges 22b. All the boss faces 30 extend on a plane parallel to the intermediate plane M. For example, for positive inserts, the intermediate plane M may be defined at an intermediate position between the upper and lower surfaces.

A chip breaker raised portion 32 is formed on the upper surface 18 in an area inside the circular-arc cutting edge 22a and the linear cutting edges 22b. A surface 32a of the chip breaker raised portion 32 which faces the cutting edge 22 partitions and forms a recess 34 on the upper surface 18 together with the rake face 24 so that the recess 34 extends along the cutting edge 22. The recess 34 can be referred to as a chip breaker groove. Furthermore, the surface 32a of the chip breaker raised portion 32 is a wall surface rising from the lowest portion 34a of the recess portion 34 and is thus hereinafter referred to as a rising wall surface. The recess 34 has a generally V-shaped cross section. The rake face 24 and the rising wall surface 32a extend almost all along the cutting edge 22 so as to provide the recess 34 in a cross section orthogonal to the cutting edge 22 at any portion thereof.

In the recess 34, a wall surface extending from the circular-arc cutting edge 22a and the linear cutting edges 22b toward the lowest portion of the recess 34 corresponds to the above-described rake face 24. The rake face 24 is an inclined surface inclined so as to be depressed gradually downward, that is, so as to approach the intermediate plane M with increasing inward distance from the cutting edge 22. Thus, the rake face 24 is formed to have a positive rake angle.

The rake face 24 is formed of substantially two faces. The rake face 24 includes a first rake face 24a and a second rake face 24b arranged in order in a direction in which the distance from the cutting edge 22 increases in the direction orthogonal to the cutting edge 22. Thus, the outer first rake face 24a is closer to the cutting edge 22 than the inner second rake face 24b, which is further inward. The first rake face 24a is one area of the rake face 24, that is, a first area of the rake face 24. The second rake face 24b is another area of the rake face 24, that is, a second area of the rake face 24.

Here, a plane (hereinafter referred to as first planes) is defined which extends so as to cross the cutting edge 22 at right angles. Here, the first plane is substantially parallel to the axis A. The first plane can be defined at any portion of the cutting edge 22. In particular, of the first planes, the first plane that divides the circular-arc cutting edge 22a into two equal parts overlaps a bisection plane B in FIG. 1 and contains the axis A. In any first plane, the rake face 24 includes the first rake face 24a and the second rake face 24b so that the rake angle of the rake face 24 varies with increasing distance from the cutting edge 22. Here, the first rake face 24a is continuous with the second rake face 24. The first rake face 24a is positioned at and extends from a cutting edge-side end of the rake face 24. The second rake face 24b is positioned at and extends from a rising wall surface-side end of the rake face 24.

Figure 4:
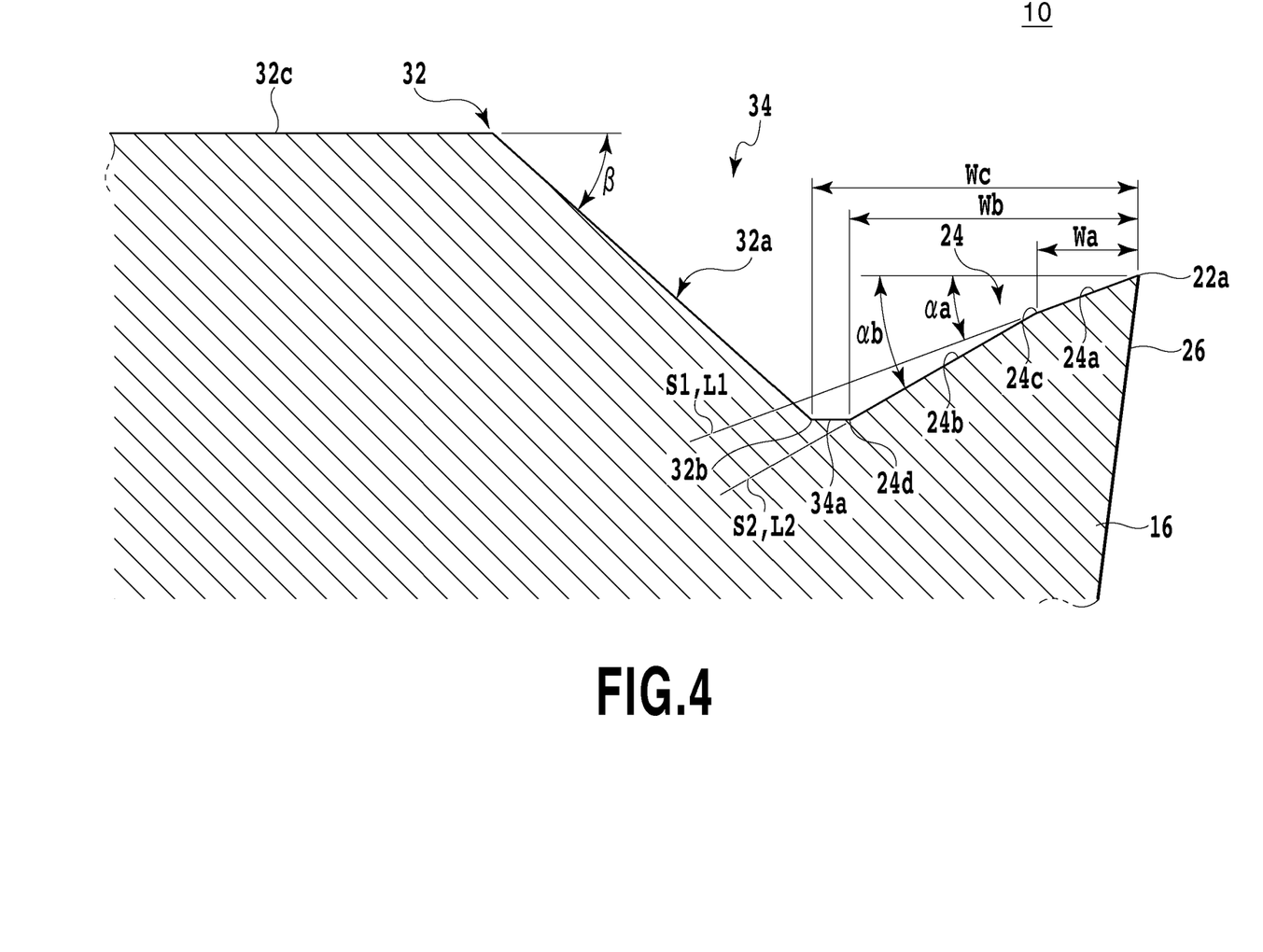
FIG. 4 is a schematic cross-sectional view taken along line IV-IV in FIG. 1.
Figure 5:
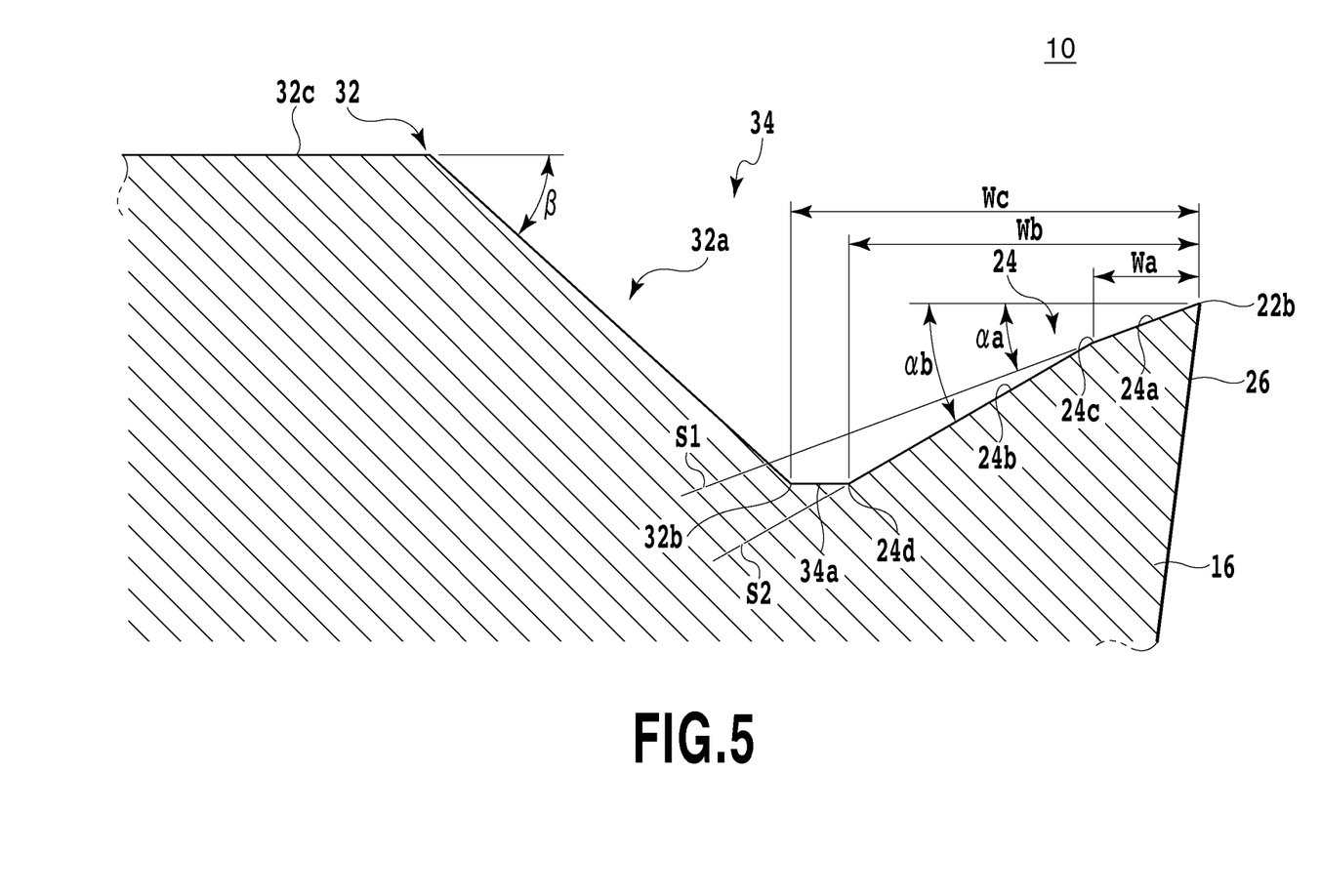
FIG. 5 is a schematic cross-sectional view taken along line V-V in FIG. 1.

The rake face 24 will further be described with schematic cross-sectional views in FIG. 4 and FIG. 5 in which the rake angle, that is, the inclination angle and the like is shown in an exaggerated manner. Here, a plane orthogonal to the axis A (hereinafter referred to as a second plane), that is, a plane parallel to the intermediate plane M, is defined. In the present embodiment, the second plane is substantially parallel to the lower surface 20 functioning as a seating face, and may be referred to as a horizontal plane. The inclination angles of the outer first rake face 24a and inner second rake face 24b to the second plane may be defined as first and second rake angles. αa and αb, respectively. The second rake angle αb of the second rake face 24b is larger than the first rake angle αa of the first rake face 24a, or αb>αa. Thus, the rake face 24 as a whole is convex so as to protrude toward the upper surface 18.

As described above, the rake face 24 is formed such that the second rake angle αb of the second rake face 24b is larger than the first rake angle αa of the first rake face 24a. The first rake angle αa of the first rake face is desirably larger than or equal to 10° and smaller than or equal to 25°, and more desirably larger than or equal to 18° and smaller than or equal to 22°. In the present embodiment, the first rake angle αa of the first rake face is set to about 20°. Furthermore, the second rake angle αb of the second rake face is desirably larger than or equal to 15° and smaller than or equal to 35°. In the present embodiment, the second rake angle αb of the second rake face is set to about 30°.

The reason for the above-described settings is as follows. Of the two rake faces of the rake face 24, that is, the first and second rake faces 24a and 24b, the outer first rake face 24a dominantly affects cutting of a workpiece. A cutting insert in which the first rake face has a first rake angle αa of smaller than 10° is insufficiently effective for thinning chips to reduce cutting resistance regardless of the second rake angle αb of the second rake face. On the other hand, a cutting insert in which the first rake face has a first rake angle αa of larger than 25° has a reduced cutting edge strength regardless of the second rake angle αb of the second rake face. This leads to the likelihood of chipping and defects in cutting of, for example, carbon steel.

In contrast, in a cutting insert in which the second rake angle αb of the second rake face is smaller than 15° and in which the first rake angle αa of the first rake face is within the above-described range, the difference in angle between the first rake face and the second rake face is small. This substantially dilutes the effect of providing of the second rake face. Furthermore, in a cutting insert in which the second rake angle αb of the second rake face is larger than 35° and in which the first rake angle αa of the first rake face is within the above-described range, the cutting insert is insufficiently thick around the periphery of the cutting edge and may become significantly defective.

Furthermore, a horizontal distance Wa from the cutting edge 22 to a terminal of the first rake face 24a, that is, the rising wall surface-side end 24c, is smaller than the radius of curvature of the circular-arc cutting edge 22a provided at the corner portion 18c. As shown in FIG. 4 and FIG. 5, the distance Wa is defined in a direction orthogonal to the cutting edge 22 as seen from the end surface side and to the axis A. Specifically, the distance Wa is desirably larger than or equal to 0.05 mm and smaller than or equal to 0.30 mm, and more preferably larger than or equal to 0.05 mm and smaller than or equal to 0.20 mm. In the present embodiment, the distance Wa is set to about 0.12 mm all along the cutting edge 22. However, the distance Wa need not be constant. That is, the distance Wa may have the above-described value near the corner portion, while being set to other values in other areas.

Furthermore, like the distance Wa, a horizontal distance Wb from the cutting edge 22 to a terminal of the second rake face 24b, that is, the rising wall surface-side end 24d, is defined in a direction orthogonal to the cutting edge 22 as seen from the end surface side and to the axis A, as shown in FIG. 4 and FIG. 5. The distance Wb is desirably larger than or equal to 0.20 mm and smaller than or equal to 0.70 mm and, in the present embodiment, is set to about 0.4 mm.

In FIG. 1 in which the cutting insert 10 is seen in a direction opposite to the upper surface 18, the chip breaker raised portion 32 is formed inside the pair of circular-arc cutting edges 22a. The rising wall surface 32a of the chip breaker raised portion 32 extends so as to form the recess 34 on the upper surface 18 together with the rake face 24. The rising wall surface 32a is a rising surface rising from the lowest portion 34a of the recess 34, and extends so as to be raised gradually upward with increasing distance from the rake face 24 so that the raising starts at a joint 32b to the lowest portion 34a of the recess 34. Here, the rising wall surface 32a is a flat surface and is inclined so that the distance from the intermediate plane M increases consistently with increasing the distance from the circular-arc cutting edge 22a and the linear cutting edges 22b.

The chip breaker raised portion 32 includes, in addition to the rising wall surface 32a, a top surface 32c connecting with the rising wall surface 32a and extending substantially parallel to the intermediate plane M. The top surface 32c is a substantially flat surface. The top surface 32c is formed higher than the cutting edge 22. This means that when such a plane as crosses the axis A at right angles and passes through the cutting edge 22 is defined, the plane extends so as to traverse the rising wall surface 32a.

The inclination angle β of the rising wall surface 32a to the second plane, that is, the horizontal plane, is larger than the second rake angle αb of the second rake face 24b. The inclination angle β is desirably set to be larger than or equal to 30° and smaller than or equal to 60°. In the present embodiment, the inclination angle β is set to about 45°. At an inclination angle β of smaller than 30°, the chip breaker raised portion 32 has difficulty subjecting chips to desired curling deformation, resulting in excessively thick chips. At an inclination angle β of larger than 60°, the chips collides excessively violently against the chip breaker, possibly increasing the cutting resistance. Hence, in this case, chattering is likely to occur, and thick chips are likely to be generated.

The rising wall surface 32a is formed in association with the rake face 24 such that an extension surface S1 or an extension line L1 defined to extend the first rake face 24a, that is, the first area, crosses the rising wall surface 32a and divides the surface 32a into two areas, on a plane defined to cross the cutting edge 22 at right angles, that is, on a cross section crossed by the cutting edge 22 at right angles. With this relationship maintained, in this case, the rising wall surface 32a connects with a groove bottom surface, that is, a recess bottom surface, extending at the lowest portion 34a of the recess 34, which corresponds to the chip breaker groove. In the recess 34, the groove bottom surface is located closest to the intermediate plane M. As shown in FIG. 4 and FIG. 5, the groove bottom surface extends between the rake face 24 and the rising wall surface 32a. Thus, as shown in FIG. 4 and FIG. 5, a rising portion, that is, the joint 32b, at which the rising wall surface 32a starts to rise from the groove bottom surface, lies lower than the extension surface S1 or extension line L1 of the first rake face 24a, that is, closer to the intermediate plane M (closer to the seating face) than the extension surface S1 or the extension line L1, and higher than an extension surface S2 or an extension line L2 of the second rake face 24b, that is, further from the intermediate plane M (closer to the upper surface 12) than the extension surface S2 or the extension line L2.

Furthermore, like the distances Wa and Wb, a horizontal distance Wc from the cutting edge 22 to the rising portion of the rising wall surface 32a is defined in a direction orthogonal to the cutting edge 22 as seen from the end surface side and to the axis A, as shown in FIG. 4 and FIG. 5. The distance Wc is desirably larger than or equal to 0.70 mm and smaller than or equal to 1.50 mm and, in the present embodiment, is set within this range.

In the cutting insert 10 according to the present embodiment, the rising wall surface 32a rises from the groove bottom surface, which is substantially horizontal and small in width and which extends inward from the terminal 24d of the second rake face 24b. The groove bottom surface may be omitted. In this case, the rising wall surface 32a is continuous with the second rake face 24b so as to rise directly from the terminal 24d of the second rake face 24b. Hence, in this case, the joint 32b, the rising portion of the rising wall surface 32a, lies on the extension surface S2 which is defined by extending the second rake face 24b.

Furthermore, the top surface 32c of the chip breaker raised portion 32 extends at the same level as that of the above-described boss faces 30 and is configured as a substantially flat surface. This configuration is particularly effective if the cutting edges 22 are formed on both end surfaces 12 and 14. In a cutting insert in which either one of the opposite end surfaces 12 and 14 is selectively used as the above-described upper surface 18, the other end surface serves as the lower surface. In this case, the top surface of the chip breaker and the boss faces in the other end surface can function as a seating face that comes into abutting contact with the bottom surface of the insert mounting seat provided on the cutting tool body.

The above-described cutting insert 10 is removably mounted on the insert mounting seat provided on the cutting tool body though this is not shown in the drawings. The cutting insert 10 is mounted on the insert mounting seat so that the lower surface 20 functioning as a seating face and at least a part of the peripheral side surface 16 are in abutting contact with the bottom surface and a wall surface of the insert mounting seat respectively. A threaded hole is formed in the insert mounting seat. The cutting insert 10 is removably fixed to the cutting tool body by screwing a screw that engages with or passes through the mounting hole 28 in the cutting insert, into the threaded hole in the insert mounting seat. A mounting mechanism or means for mounting the cutting insert 10 on the cutting tool body is not limited to the above-described configuration. Any other mechanical or chemical mechanism or means may be adopted as a mounting mechanism or means.

In a double-faced cutting insert in which either one of the opposite end surfaces can be selectively used as the upper surface as described above, the boss faces and the top surface of the chip breaker on one end surface can be brought into abutting contact with the bottom surface of the insert mounting seat.

With the cutting insert 10 mounted on the cutting tool body, the upper surface 18 is set in a cutting direction during cutting processing. At this time, in a usable cutting edge 22' on the upper surface 18, one of the linear cutting edges 22b and a part of the circular-arc cutting edge 22a adjacent to the linear cutting edge 22b function as a side cutting edge that faces a feeding direction side. In contrast, during the cutting processing, in the usable cutting edge 22', the other linear cutting edge 22b and the remaining part of the circular-arc cutting edge 22a adjacent to the other linear cutting edge 22b which does not function as the side cutting edge function as a end cutting edge that faces a machined surface of the workpiece. The usable cutting edge is a part of the cutting edges 22 included in the cutting tool with the cutting insert 10 mounted thereon which part cuts into a workpiece, that is, the cutting edge involved in cutting.

The cutting insert 10 is used to turn an outer peripheral surface of the workpiece rotating around the rotational center line thereof, by feeding the cutting insert 10, for example, parallel to the rotational center line of the workpiece. In this case, the side cutting edge can entirely contact the workpiece in a direction normal to the rotational center line (cutting direction) and be mainly involved in cutting. In this case, the end cutting edge can contact the machined surface of the workpiece and be involved in formation of the machined surface.

In the above-described cutting processing, chips mainly generated at the side cutting edge of the cutting insert 10 flow from the side cutting edge toward the rising wall surface 32a. At this time, the chips pass over the first rake face 24a while contacting a surface of the first rake face 24a.

In the cutting insert according to the present embodiment, the distance Wa is short and thus the first rake face 24a is narrow. Hence, for the rake face as a whole, involved in the generation of chips, the magnitude of the rake angle is significantly affected mainly by the second rake angle of the inner second rake face 24b. Thus, the cutting insert according to the present embodiment enables a reduction in cutting resistance and in the thickness of chips.

Furthermore, since the second rake angle of the second rake face is evidently larger than the first rake angle of the first rake face as described above, chips may be disposed of without coming into contact with the second rake face 24b. In this case, such a configuration of the rake face further contributes to reducing the cutting resistance. Thus, the cutting insert and chips can be restrained from generating heat. Additionally, in this case, the contact area in which the chips contact the cutting insert is narrow, allowing heat generated in the chips to be restrained from propagating to the cutting insert. Therefore, an increase in the surface temperature of the cutting insert can be suppressed.

A simple increase in the rake angle of the rake face generally results in a decrease in cutting edge strength. In contrast, in the cutting insert 10, the first rake face 24a is small in size (the length from the cutting edge), and the second rake face 24b with a larger rake angle is formed adjacent to the first rake face 24a as described above. Thus, the rake angle of the rake face 24 as a whole can be set to a large value, with a decrease in cutting edge strength minimized.

Chips passing over the first rake face 24a flow onto the second rake face 24b. The second rake angle $\alpha b$ of the second rake face 24b is larger than the first rake angle $\alpha a$ of the first rake face 24a. That is, the rake face 24 has a convex shape. Thus, chips flowing from the first rake face 24a to the second rake face 24b fail to come into positive or substantial contact with the surface of the second rake face 24b. This suppresses a rise in the temperature of the chips and significantly restrains the abrasion resistance between the chips and the rake face. Therefore, the tool life of the cutting insert can be improved.

However, if a ductile workpiece is cut, chips are easily stretched and elastically deformed and may thus come into contact with the surface of the second rake face 24b. However, even in such a case, since the second rake angle $\alpha b$ of the second rake face is set to a large positive angle of at least 15° and at most 35°, chips can be broken before the thickness thereof increases. This suppresses a rise in the temperatures of the chips, the circular-arc cutting edge 22a, the linear cutting edges 22b, the second rake face 24b, and the relief face 26 which is caused by the contact between the chips and the second rake face 24b. Furthermore, the abrasion resistance applied to the second rake face 24b is effectively restrained. Therefore, the life of the cutting insert is improved.

Furthermore, as described above, the distance Wa from the cutting edge to the terminal of the first rake face is smaller than the radius of curvature of the circular-arc cutting edge 22a provided at the corner portion 18c. Since the horizontal distance Wa from the cutting edge to the terminal of the first rake face is set to such a magnitude, the distance Wa is prevented from being excessive with respect to the radius of curvature of the circular-arc cutting edge 22a, which affects a feed rate f (mm/rev). Therefore, the cutting insert 10 enables high-feed-rate cutting. Particularly desirably, the distance Wa from the cutting edge to the terminal of the first rake face is larger than or equal to 0.05 mm and smaller than or equal to 0.30 mm.

This setting is made with the feed rate f (mm/rev) set in a condition for cutting processing using such a cutting insert as described above. When the distance Wa from the cutting edge to the terminal of the first rake face is set within this range, an increase in the thickness of chips is suppressed which is caused by the contact between the chips and the first rake face 24*a*. This suppresses a rise in the temperatures of the chips, the circular-arc cutting edge 22*a*, the linear cutting edges 22*b*, the first rake face 24*a*, and the relief face 26, and furthermore, the abrasion resistance applied to the first rake face 24*a* is effectively restrained. This facilitates a spontaneous curly deformation of chips. Therefore, the tool life is further improved.

Additionally, as described above, with regard to the second rake face 24*b*, the distance Wb from the cutting edge to the terminal of the second rake face 24*b* is set to be larger than or equal to 0.20 mm and smaller than or equal to 0.70 mm. Thus, chips are restrained from coming into contact with the surface of the second rake face 24*b* during cutting of a workpiece involving generation of chips that are easily stretched. This enables suppression of an increase in the temperature of the chips and the above-described components and in the abrasion resistance applied to the second rake face 24*b*.

In addition, to avoid the contact between chips and the second rake face 24*b*, the difference between the second rake angle αb of the second rake face and the first rake angle αa of the first rake face is desirably increased. However, an excessive second rake angle αb of the second rake face may reduce the cutting edge strength. Thus, the second rake angle αb of the second rake face is set to be larger than or equal to 15° and smaller than or equal to 35°.

In a direction or a cross section orthogonal to the cutting edge, the rising portion 32*b* of the rising wall surface 32*a* may lie lower than the extension surface S1 which is defined by extending the first rake face and lie on or higher than the extension surface S2 which is defined by extending the second rake face. Thus, chips flowing substantially along the first rake face or passing substantially along the second rake face come into positive contact with the rising wall surface 32*a*. The contact rapidly changes the direction of the flow of the chips, and the chips are thus subjected to curling deformation into a curved shape or broken. This leads to stable chips disposal.

Furthermore, since the inclination angle β of the rising wall surface 32*a* is larger than the second rake angle αb of the second rake face, chips contacting the rising wall surface 32*a* are significantly deformed. Thus, the chips can be reliably subjected to curl deformation or broken.

Moreover, since the inclination angle β is larger than the second rake angle αb, chips can be allowed to quickly leave the rising wall surface 32*a*, reducing the abrasion resistance.

Additionally, the highest part of the rising wall surface 32*a* is higher than the circular-arc cutting edge 22*a* and the linear cutting edges 22*b*. Thus, chips stretching upward with respect to the first rake face 24*a* or spontaneously subjected to curling deformation can be reliably brought into contact with the rising wall surface 32*a*. This serves to improve chips disposal.

In addition, the distance Wc from the cutting edge to the rising portion of the rising wall surface is set to be larger than or equal to 0.70 mm and smaller than or equal to 1.50 mm. This is to allow chips spontaneously subjected to curling deformation to be reliably brought into contact with the rising wall surface. The above-described setting is also to suppress an increase in cutting resistance resulting from excessively violent collision of stretched chips against the rising wall surface when the chips come into contact with the rising wall surface. The above-described setting is also to allow the chips to be smoothly subjected to curling deformation or cut.

Figure 6:
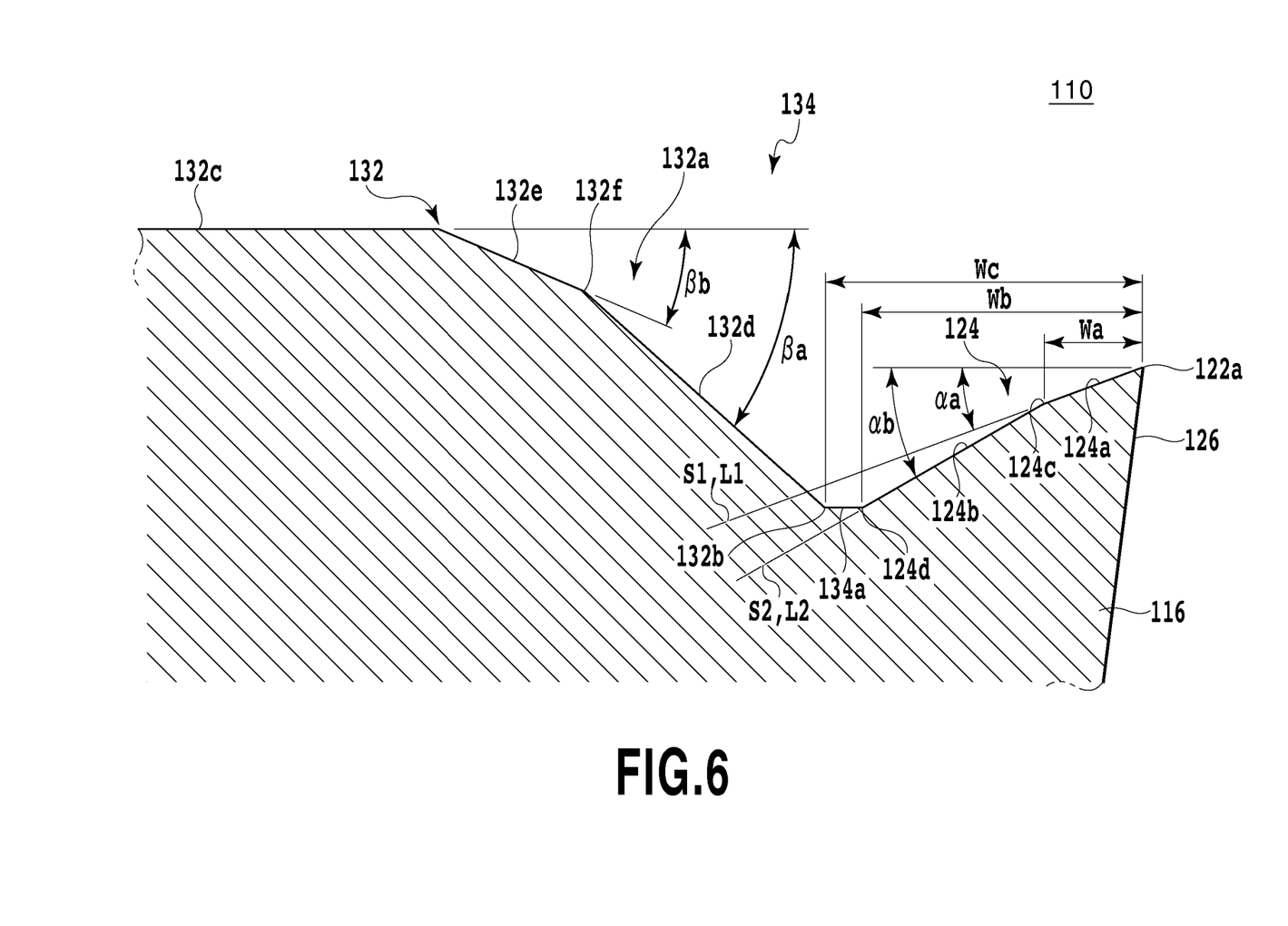
FIG. 6 is a schematic cross-sectional view of a part of a cutting insert according to a second embodiment of the present invention.

FIG. 6 shows a cross-section of a cutting insert 110 according to a second embodiment of the present invention which will now be described. However, only the main differences between the cutting insert 110 and the cutting insert 10 according to the above-described first embodiment will be described below. Components of the cutting insert 110 corresponding to the already described components are denoted by corresponding (by addition of '100' to the reference numerals used to describe cutting insert 10) or the same reference numerals and will not be described below.

Compared to the above-described cutting insert 10, the cutting insert 110 is characterized in that a rising wall surface 132*a* includes two surfaces. The configuration of the rising wall surface 132*a* is generally similar to that of the rake face 24 and a rake face 124. FIG. 6 is a cross-sectional view of the cutting insert 110 corresponding to a cross-sectional view of the cutting insert 10 in FIG. 4.

The rising wall surface 132*a* is formed of substantially two surfaces. Here, such planes as are orthogonal to a cutting edge 122, that is, the above-described first plane, are defined. Here, the first plane is substantially parallel to the axis A as described above. In any first plane, the rising wall surface 132*a* includes two surfaces 132*d* and 132*e* so that the inclination angle of the rising wall surface 132*a* varies with increasing distance from the cutting edge 122. The outer first rising wall surface 132*d* and the inner second rising wall surface 132*e* are arranged in order in a direction in which the distance from the cutting edge 122 increases. The first rising wall surface 132*d* is one area of the rising wall surface 132*a*, that is, a first rising wall surface area. The second rising wall surface 132*e* is another area of the rising wall surface 132*a*, that is, a second rising wall surface area. Here, the first rising wall surface 132*d* is continuous with the second rising wall surface 132*e*. The first rising wall surface 132*d* is positioned at and extends from a cutting edge-side end of the rising wall surface 132*a*. The second rising wall surface 132*e* is positioned at and extends from a top surface 132*c*-side end of the rising wall surface.

The inclination angle βa of the first rising wall surface 132*d* to a second plane, that is, a horizontal plane, is larger than the inclination angle βb of the second rising wall surface 154 to the second plane. Thus, the rising wall surface 132*a* as a whole has a convex shaped toward an upper face 118.

Like the above-described top surface 32*c*, the top surface 132*c* of the chip breaker raised portion 132 is formed higher than the cutting edge 122. Moreover, a boundary portion or an intersection 132*f* between the first rising wall surface 132*d* and the second rising wall surface 132*e* is formed higher than the cutting edge 122, that is, further from the intermediate plane M than the cutting edge 122 as shown in FIG. 6. Thus, when such a plane as crosses the axis A at right angles and passes through the cutting edge 122 is defined, the plane extends so as to traverse the first rising wall surface 132*d*.

The cutting insert 110 configured as described above exerts, in addition to the above-described advantageous functions and effects of the cutting insert 10, the following advantageous functions and effects.

The rising wall surface 132*a* includes the first rising wall surface 132*d* and the second rising wall surface 132*e*, and the inclination angle βa of the first rising wall surface 132*d* is larger than the inclination angle βb of the second rising wall surface 132*e*. Thus, the second rising wall surface 132*e* is significantly inclined in a direction in which the distance from a circular-arc cutting edge 122*a* and linear cutting edges 122*b* increases with respect to the first rising wall surface 132*d*. The rising wall surface 132a as a whole has a convex shape. Hence, when chips contacting the first rising wall surface 132d are subjected to curling deformation and flow upward in the direction in which the distance from the circular-arc cutting edge 122a and the linear cutting edges 122b increases, the chips are restrained from coming into contact with the second rising wall surface 132e. This minimizes the contact area in which the rising wall surface 132a contacts the chips to allow the chips to be smoothly discharged. Consequently, appropriate chips disposal can be achieved. That is, the inclination angle of the second rising wall surface is different from that of the first rising wall surface so as to promote the discharge of the chips.

Furthermore, the intersection 132f between the first rising wall surface 132d and the second rising wall surface 132e lies higher than the circular-arc cutting edge 122a and the linear cutting edges 122b. Thus, chips passing along a first rake face 124a or a second rake face 124b can be reliably received by the first rising wall surface 132d. Furthermore, the chips subjected to curling deformation by the contact with the first rising wall surface 132d can be smoothly discharged without coming into contact with the second rising wall surface 132e.

Figure 7:
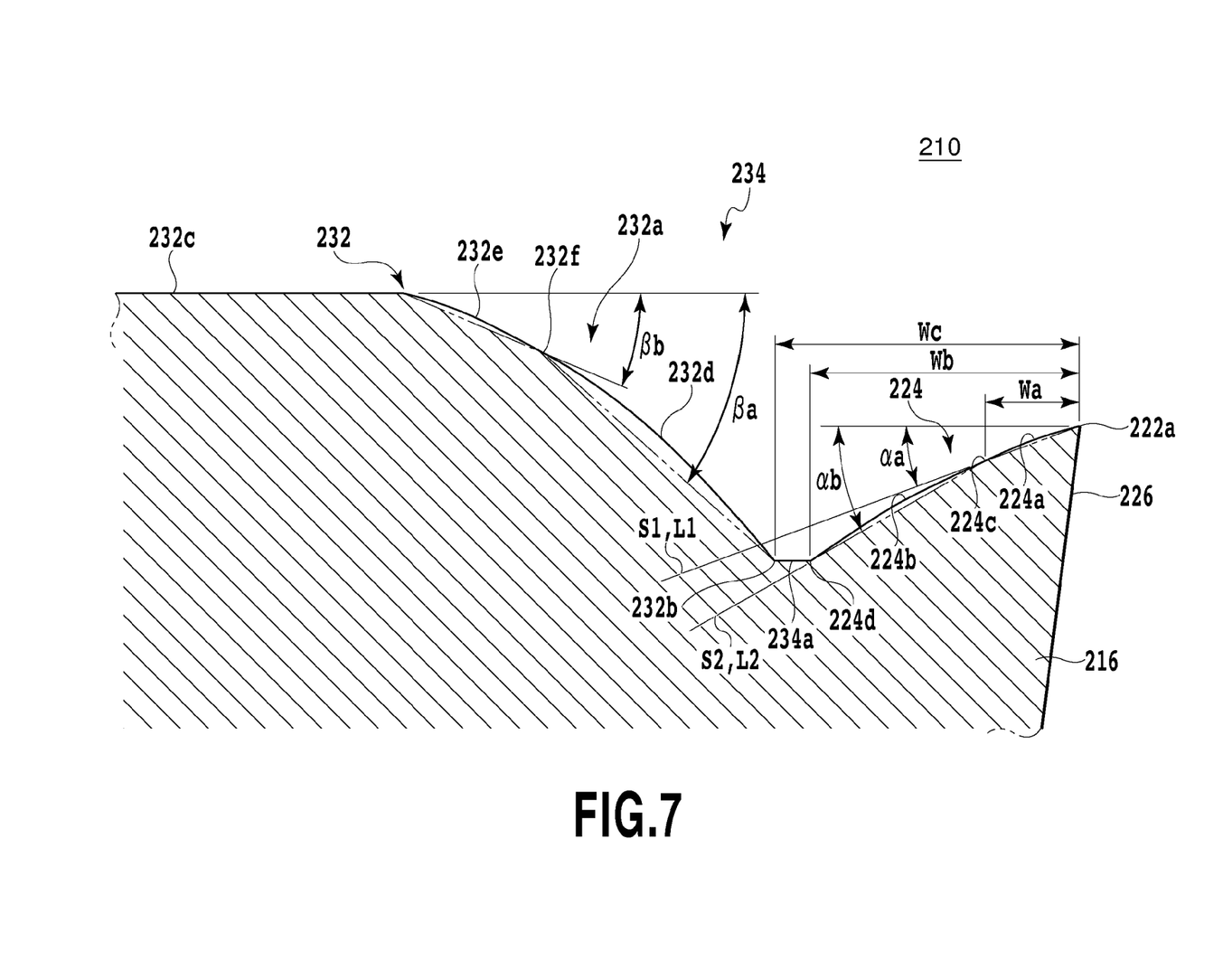
FIG. 7 is a schematic cross-sectional view of a part of a cutting insert according to a third embodiment of the present invention.

FIG. 7 shows a cross-section of a cutting insert 210 according to a third embodiment of the present invention which will now be described. However, only the main differences between the cutting insert 210 and both the cutting inserts 10 and 110 according to the above-described first and second embodiments will be described below. Components of the cutting insert 210 corresponding to the already described components are denoted by corresponding or the same reference numerals and will not be described below.

Compared to the above-described cutting insert 10, the cutting insert 210 is characterized in that a rising wall surface 232a includes two areas, specifically, two surfaces 232d and 232e. Compared to the above-described cutting inserts 10 and 110, the cutting insert 210 is characterized in that a rake face 224 and the rising wall surface 232a are each curved. That is, a first rake face 224a, a second rake face 224b, the first rising wall surface 232d, and the second rising wall surface 232e are each curved. FIG. 7 is a cross-sectional view of the cutting insert 210 corresponding to a cross-sectional view of the cutting insert 10 in FIG. 4.

In this case, the rake angle or inclination angle of each of the first and second rake faces and the inclination angle of each of the first and second rising wall surfaces are defined in association with a phantom line or a phantom surface. In a cross-sectional view in FIG. 7, the first rake face 224a, the second rake face 224b, the first rising wall surface 232d, and the second rising wall surface 232e are each shaped like a curve projecting toward the upper surface-side. Then, each rake angle or inclination angle is defined by the angle between a second plane or a horizontal plane and a straight line or a plane (depicted as a chord outlined by a chain double-dashed line in FIG. 7) joining one end of the surface (for example, a cutting edge-side end or an end closer to a cutting edge 222a) to the other end (for example, a top surface 232c-side end of a chip breaker raised portion 232 or an end further from the cutting edge 222). Specifically, the first rake angle of the first rake face 224a is defined by the angle between the horizontal plane and a line L1 or a surface S1 joining a cutting edge-side end (leading end) of the first rake face 224a, for example, the portion of the first rake face 224 corresponding to the circular-arc cutting edge 222a, to a top surface-side end (trailing end) 224c. Furthermore, the second rake angle of the second rake face 224b is defined by the angle between the horizontal plane and a line L2 or a surface S2 joining a leading end 224c to a trailing end 224d of the second rake face.

The cutting insert 210 configured as described above exerts the same advantageous functions and effects as those produced by the above-described cutting inserts 10 and 110.

At least one of the first rake face, the second rake face, the first rising wall surface, and the second rising wall surface may be flat or curved. Furthermore, if any of these surfaces is curved, that surface is not limited to a shape protruding upward like the cutting insert 210 but may be protruded downward, that is, toward the lower surface.

As described above, in the cutting inserts according to the embodiments of the present invention, the rake face has a positive rake angle all along the cutting edge. Thus, chips can be reduced in thickness. In particular, the cutting inserts include the outer first rake face and the inner second rake face arranged in order in the direction in which the distance from the cutting edge increases as described above. The rake angles of the rake faces increase in a stepwise fashion consistently with the distance from the cutting edge. Hence, the present invention exerts the advantageous functions and effect of promoting the flow of chips and reducing the chips in thickness. This suppresses a rise in the temperatures of the cutting edge, the first and second rake face, and the relief face to enable the tool life of the cutting insert to be improved.

Furthermore, since the present invention exerts the effect of reducing chips in thickness, there is a marked difference in temperature between a sheared surface side (the side facing the rake face) and the opposite side of the chips in the thickness direction thereof. Thus, the difference in temperature urges the chips to undergo curling deformation, allowing the chips to be more appropriately disposed of. Additionally, the reduced thickness of the chips serves to suppress the progressive wear of the chip breaker resulting from contact with the chips. This allows the rising wall surface of the chip breaker to dispose stably of the chips over a long time.

In addition, since the second rake angle (inclination angle) of the second rake face to the horizontal plane is larger than the first rake angle (inclination angle) of the first rake face, chips having passed over the first rake face preferably travel over the second rake face without coming into contact with the surface of the second rake face. Thus, the chips, the cutting edge, the first rake face, and the relief face can be effectively restrained from becoming hot. This allows the tool life to be further improved.

The cutting inserts according to the embodiments of the present invention have been described. However, various changes may be applied to the embodiments. The shape of the upper surface of the cutting insert or the like is not limited to the rhombus but may be changed to a substantial polygon such as a square, a rectangle, a parallelogram, or a triangle. That is, the cutting insert may be shaped like a substantially polygonal plate. Furthermore, the cutting insert may be manufactured using any of various materials. At least part of the circular-arc cutting edge and the linear cutting edge may be formed of a hard material such as cemented carbide, covered cemented carbide, cermet, or ceramics, or an extra-high-pressure sintered compact such as sintered diamond or sintered cubic boron nitride.

The cutting inserts 10, 110, and 210 according to the above-described embodiments are cutting inserts for turning the outer periphery of a workpiece. However, the present invention is applicable to cutting inserts configured to turn the inner periphery or end surface of a workpiece. Furthermore, the present invention is applicable to cutting inserts for use in milling and drilling.

Additionally, the cutting inserts according to the embodiments of the present invention have been described. However, the present invention is applicable to cutting tools other than cutting inserts. The present invention also relates to a cutting tool including an edge portion with the characteristics of the above-described cutting insert. Such a cutting tool may include a tip or an edge portion integrally mounted thereon and may have the above-described rake face and rising wall surface formed along a cutting edge of the edge portion.

In the above-described embodiments, the rake face includes two areas (particular range). However, the rake surface may include three or more areas. One area adjacent to the cutting edge may be a first area as mentioned above, and the other areas may be a second area, a third area, and so on. Furthermore, the rising wall surface is also not limited to one or two areas but may similarly include three or more areas. These areas desirably include definite boundary portions or joints between their areas but the present invention is not limited to the definite boundary portions or joints. Additionally, each area of the rake face is not limited to a flat shape or a simple curved shape but may have any of various shapes, for example, a shape with very small recesses and protrusions or a corrugated shape. This also applies to each area of the rising wall surface.

In the above-described embodiments, the cutting edge is formed to extend substantially on one plane orthogonal to the axis A, and however, the cutting edge may extend so as to traverse the plane. In this case, a part of the cutting edge located furthest from the intermediate plane M can be referred to as the highest point of the cutting edge. For example, when the relationship between the cutting edge and the rising wall surface is set, the highest point of the cutting edge may be defined as a reference for the cutting edge.

In the above-described embodiments and variations thereof, the present invention has been described somewhat specifically. However, the present invention is not limited to the embodiments and variations thereof. It should be appreciated that, with regard to the present invention, various alterations and changes may be made to the embodiments and variations thereof without departing from the spirits and scopes of the invention recited in the claims. That is, the present invention includes any variations, applications, and equivalents embraced by the concepts of the present invention defined by the claims.

What is claimed is:

1. A cutting insert with a cutting edge, the cutting insert comprising:
   two opposite end surfaces, a peripheral side surface extending between the two end surfaces, and a cutting edge formed at an intersection between one end surface of the two end surfaces and the peripheral side surface;
   a rake face extending along the cutting edge and formed to have a positive rake angle, the rake face comprising a first area and a second area arranged in order in a direction in which a distance from the cutting edge increases, the rake face being formed such that a non-zero second rake angle ($\alpha b$) in the second area is larger than a non-zero first rake angle ($\alpha a$) in the first area; and
   a rising wall surface extending so as to form a recess along the cutting edge together with the rake face,
   wherein the rising wall surface comprises a first rising wall surface area and a second rising wall surface area arranged in order in a direction in which a distance from the cutting edge increases, a non-zero inclination angle ($\beta b$) of the second rising wall surface area is less than a non-zero inclination angle ($\beta a$) of the first rising wall surface area, and the first rising wall surface area is continuous with the second rising wall surface area.

2. The cutting insert according to claim 1, wherein the one end surface is rotationally symmetric around an axis defined to penetrate the two end surfaces, and
the rake face and the rising wall surface extending on the one end surface are formed in association with the cutting edge.

3. The cutting insert according to claim 2, wherein the first area is a first rake face, the second area is a second rake face, and the first rake face is continuous with the second rake face.

4. The cutting insert according to claim 3, wherein in a direction orthogonal to the cutting edge as seen from the end surface side and to the axis, a distance from the cutting edge to an end of the first rake face which is closer to the rising wall surface is larger than or equal to 0.05 mm and smaller than or equal to 0.20 mm, and an inclination angle of the first rake face to a plane orthogonal to the axis is larger than or equal to 10° and smaller than or equal to 25°.

5. The cutting insert according to claim 3, wherein in the direction orthogonal to the cutting edge as seen from the end surface side and to the axis, a distance from the cutting edge to an end of the second rake face which is closer to the rising wall surface is larger than or equal to 0.20 mm and smaller than or equal to 0.70 mm, and an inclination angle of the second rake face to a plane orthogonal to the axis is larger than or equal to 15° and smaller than or equal to 35°.

6. The cutting insert according to claim 3, wherein in the direction orthogonal to the cutting edge as seen from the end surface side and to the axis, a distance from the cutting edge to a cutting edge-side end of the rising wall surface is larger than or equal to 0.70 mm and smaller than or equal to 1.50 mm, and an inclination angle of the rising wall surface to a plane orthogonal to the axis is larger than or equal to 30° and smaller than or equal to 60°.

7. The cutting insert according to claim 1, wherein the rising wall surface is formed in such a manner that a plane defined to pass through the cutting edge orthogonally to the axis traverses the first rising wall surface area of the rising wall surface.

8. An indexable polygonal cutting insert having an axis of rotational symmetry (A) and comprising:
   opposite first and second end surfaces through which the axis of rotational symmetry passes, a peripheral side surface extending between the first and second end surfaces, and a cutting edge formed at an intersection between at least the first end surface and the peripheral side surface, and
   a downwardly sloping rake face extending along the cutting edge and formed to have a positive rake angle, the rake face comprising an outer first rake face closest to the cutting edge and having a first non-zero rake angle ($\alpha a$) and an inner second rake face remote from the cutting edge and having a second non-zero rake angle ($\alpha a$) which is larger than the first rake angle ($\alpha a$); and
   a rising wall surface formed inward of the rake face and extending inwardly so as to form a recess along the cutting edge together with the rake face, wherein:
   the first rake face extends to a first horizontal distance (Wa) from the cutting edge;
   the second rake face extends to second horizontal distance (Wb) from the cutting edge, the second horizontal distance (Wb) being greater than the first horizontal distance (Wa); and
   the rising wall surface is spaced at least a third horizontal distance (Wc) from the cutting edge;
   wherein the rising wall surface comprises a first rising wall surface area and a second rising wall surface area arranged in order in a direction in which a distance from the cutting edge increases, a non-zero inclination angle of the second rising wall surface area (βb) is less than a non-zero inclination angle of the first rising wall surface area (βa), and the first rising wall surface area is continuous with the second rising wall surface area.

9. The indexable polygonal cutting insert according to claim 8, wherein:
the first rake face, the second rake face, the first rising wall surface, and the second rising wall surface are each curved.

10. The indexable polygonal cutting insert according to claim 8, wherein:
the second rake face extends for a longer horizontal distance than the first rake face; and
the third horizontal distance (Wc) is greater than the second horizontal distance (Wb).

11. The indexable polygonal cutting insert according to claim 10, wherein
the first horizontal distance (Wa) is larger than or equal to 0.05 mm and smaller than or equal to 0.20 mm; and
first rake angle (αa) is larger than or equal to 10° and smaller than or equal to 25°.

12. The indexable polygonal cutting insert according to claim 10, wherein
the second horizontal distance (Wb) is larger than or equal to 0.20 mm and smaller than or equal to 0.70 mm; and
the second rake angle (αb) is larger than or equal to 15° and smaller than or equal to 35°.

13. The indexable polygonal cutting insert according to claim 10, wherein
the third horizontal distance (Wc) is larger than or equal to 0.70 mm and smaller than or equal to 1.50 mm; and
the first and second inclination angles (βa, βb) of the rising wall surface both are larger than or equal to 30° and smaller than or equal to 60°.

14. The indexable polygonal cutting insert according to claim 8, wherein:
the first horizontal distance (Wa) is larger than or equal to 0.05 mm and smaller than or equal to 0.20 mm;
first rake angle (αa) is larger than or equal to 10° and smaller than or equal to 25°;
the second horizontal distance (Wb) is larger than or equal to 0.20 mm and smaller than or equal to 0.70 mm; and
the second rake angle (αb) is larger than or equal to 15° and smaller than or equal to 35°;
the third horizontal distance (Wc) is larger than or equal to 0.70 mm and smaller than or equal to 1.50 mm; and
the first and second inclination angles (βa, βb) of the rising wall surface both are larger than or equal to 30° and smaller than or equal to 60°.

15. A cutting insert having an axis of rotational symmetry and comprising two opposite end surfaces through which the axis of rotational symmetry passes, a peripheral side surface extending between the two end surfaces, and a plurality of cutting edges formed at an intersection between one end surface of the two end surfaces and the peripheral side surface, the cutting insert, with regard to each cutting edge, comprising:
a rake face, on the one end surface, extending along the cutting edge and formed to have a positive rake angle, the rake face comprising a first area and a second area arranged in order in a direction in which a distance from the cutting edge increases, the rake face being formed such that a second rake angle in the second area is larger than a first rake angle in the first area; and
a rising wall surface, on the one end surface, extending so as to form a recess along the cutting edge together with the rake face;
wherein the cutting edge includes a circular-arc cutting edge, and the rake face and the rising wall surface extend so as to form the recess along the circular-arc cutting edge,
the rising wall surface comprises a first rising wall surface and a second rising wall surface continuously arranged in order in a direction in which a distance from the circular-arc cutting edge increases in such a manner that the rising wall surface has an outwardly convex shape on a plane defined to be orthogonal to the circular-arc cutting edge as the cutting insert is seen from a side opposing the one end surface, and
the rising wall surface is formed in such a manner that a plane defined to pass through the circular-arc cutting edge orthogonally to the axis traverses the first rising wall surface of the rising wall surface.

* * * * *